United States Patent
Miller

(10) Patent No.: US 10,011,418 B2
(45) Date of Patent: Jul. 3, 2018

(54) HIGH EFFICIENCY BOLT-ON THERMAL INSULATING PANEL AND THERMALLY INSULATED SHIPPING CONTAINER EMPLOYING SUCH A THERMAL INSULATING PANEL

(71) Applicant: Minnesota Thermal Science, LLC, Plymouth, MN (US)

(72) Inventor: Jason Miller, Hudson, WI (US)

(73) Assignee: PELICAN BIOTHERMAL LLC, Plymouth, MN (US)

(*) Notice: Subject to any disclaimer, the term of this patent is extended or adjusted under 35 U.S.C. 154(b) by 268 days.

(21) Appl. No.: 14/498,306

(22) Filed: Sep. 26, 2014

(65) Prior Publication Data

US 2016/0090227 A1    Mar. 31, 2016

(51) Int. Cl.
| | | |
|---|---|---|
| *F25D 23/06* | (2006.01) | |
| *B65D 81/38* | (2006.01) | |
| *B23P 19/04* | (2006.01) | |
| *B65B 63/00* | (2006.01) | |
| *F16L 59/065* | (2006.01) | |
| *F16L 59/12* | (2006.01) | |
| *B65D 6/24* | (2006.01) | |

(52) U.S. Cl.
CPC .......... *B65D 81/3816* (2013.01); *B23P 19/04* (2013.01); *B65B 63/00* (2013.01); *B65D 11/1873* (2013.01); *B65D 81/3823* (2013.01); *F16L 59/065* (2013.01); *F16L 59/12* (2013.01); *B65D 81/38* (2013.01)

(58) Field of Classification Search
CPC ........................ B65D 81/3816; B65D 81/3823; B65D 81/38; B65D 11/1873; B23P 19/04; B65B 63/00; F16L 59/065; F16L 59/12
USPC .... 220/592.2, 592.25, 592.27, 592.09, 592.1
See application file for complete search history.

(56) References Cited

U.S. PATENT DOCUMENTS

| | | | |
|---|---|---|---|
| 3,302,818 A | | 2/1967 | Morrison |
| 3,982,681 A | * | 9/1976 | Graves ............ B65D 3/28 220/4.24 |
| 4,070,848 A | | 1/1978 | Lingle |
| 4,090,659 A | | 5/1978 | Galmiche et al. |
| 4,899,513 A | | 2/1990 | Morris |
| 5,082,335 A | | 1/1992 | Cur et al. |
| 5,143,245 A | | 9/1992 | Malone |
| 5,199,589 A | | 4/1993 | Noble |
| 5,361,603 A | | 11/1994 | Merritt-Munson |
| 5,527,411 A | | 6/1996 | Jutte |

(Continued)

FOREIGN PATENT DOCUMENTS

| | | |
|---|---|---|
| EP | 0085011 A1 | 8/1983 |
| EP | 0942664 B1 | 2/2002 |

(Continued)

*Primary Examiner* — J. Gregory Pickett
*Assistant Examiner* — Elizabeth Volz
(74) *Attorney, Agent, or Firm* — Sherrill Law Offices, PLLC

(57) ABSTRACT

A bolt-on thermal insulation panel assembly, shipping container constructed from such thermal insulation panel assemblies, method of assembling and method of using to transport thermally labile goods. The thermal insulation panel assembly includes a solid vacuum insulation panel with a superimposed layer of rigid foam insulation having a plurality of mechanical fasteners secured to the layer of rigid foam insulation.

21 Claims, 6 Drawing Sheets

(56) References Cited

U.S. PATENT DOCUMENTS

| | | | |
|---|---|---|---|
| 5,601,202 A | 2/1997 | Meacham et al. | |
| 5,669,233 A | 9/1997 | Cook et al. | |
| 5,791,150 A | 8/1998 | Bosher et al. | |
| 5,897,932 A * | 4/1999 | McGarth | E04B 1/803 220/592.27 |
| 6,164,035 A | 12/2000 | Roberts | |
| 6,183,181 B1 | 2/2001 | Leistner | |
| 6,202,223 B1 | 3/2001 | Chartrand | |
| 6,266,972 B1 | 7/2001 | Bostic | |
| 6,405,644 B1 | 6/2002 | Winecker | |
| 7,028,504 B2 | 4/2006 | Derifield | |
| 7,225,632 B2 | 6/2007 | Derifield | |
| 7,263,855 B2 | 9/2007 | Meyer et al. | |
| 7,913,511 B2 | 3/2011 | Meyer et al. | |
| 8,037,653 B2 | 10/2011 | Homann, Jr. | |
| 8,117,792 B2 * | 2/2012 | Kim | A47F 3/0482 52/309.14 |
| 8,162,542 B2 | 4/2012 | Harman et al. | |
| 8,202,599 B2 | 6/2012 | Henn | |
| 8,348,087 B2 | 1/2013 | Sawaki | |
| 8,572,913 B2 | 11/2013 | Stubblefield et al. | |
| 2002/0004724 A1 | 1/2002 | Eastman | |
| 2002/0134962 A1 | 9/2002 | Romero | |
| 2004/0226309 A1 | 11/2004 | Broussard | |
| 2007/0175236 A1 | 8/2007 | Dryzun | |
| 2008/0193712 A1 | 8/2008 | Desjardins | |
| 2009/0032541 A1 | 2/2009 | Rogala et al. | |
| 2009/0039088 A1 | 2/2009 | Williams et al. | |
| 2009/0126600 A1 | 5/2009 | Zupancich et al. | |
| 2010/0072211 A1 * | 3/2010 | Dickinson | B65D 43/16 220/592.27 |
| 2011/0049164 A1 | 3/2011 | Banks et al. | |
| 2011/0126571 A1 | 6/2011 | Selin et al. | |
| 2011/0146054 A1 | 6/2011 | Selin et al. | |
| 2013/0228583 A1 | 9/2013 | Mayer | |
| 2013/0319020 A1 | 12/2013 | Neeld | |
| 2014/0260933 A1 * | 9/2014 | Ardiff | F41H 5/0464 89/36.02 |

FOREIGN PATENT DOCUMENTS

| | | |
|---|---|---|
| EP | 1887154 A2 | 2/2008 |
| EP | 2022728 A1 | 2/2009 |
| EP | 2053325 A1 | 4/2009 |
| EP | 2145060 B1 | 2/2014 |
| EP | 2703200 A1 | 3/2014 |
| GB | 1061791 | 3/1967 |
| GB | 1419741 | 12/1975 |
| GB | 1531581 | 11/1978 |
| GB | 2322358 | 8/1998 |
| GB | 2362702 | 11/2001 |
| GB | 2508415 | 6/2014 |
| JP | 52156072 | 12/1977 |
| JP | 57008321 | 2/1982 |
| JP | 2061254 | 3/1990 |
| JP | 10183802 | 7/1998 |
| JP | 2000248653 | 9/2000 |
| JP | 2000274589 A2 | 10/2000 |
| JP | 2000314586 | 11/2000 |
| JP | 2002031474 | 1/2002 |
| JP | 2004223759 | 8/2004 |
| JP | 2004234392 | 8/2004 |
| JP | 2004278835 | 10/2004 |
| JP | 2005282840 | 10/2005 |
| JP | 4224327 | 2/2009 |
| JP | 4398661 | 1/2010 |
| JP | 4878891 | 2/2012 |
| WO | 92/15506 A1 | 9/1992 |
| WO | 95/10378 A1 | 4/1995 |
| WO | 02/074642 A1 | 9/2002 |
| WO | 03/030662 A1 | 4/2003 |
| WO | 2005/0990881 A1 | 9/2005 |
| WO | 2006/082433 A1 | 8/2006 |
| WO | 2008/122074 A1 | 10/2008 |
| WO | 2011/063938 A2 | 6/2011 |
| WO | 2012143409 A1 | 10/2012 |
| WO | 2013155401 A1 | 10/2013 |
| WO | 2014023911 A1 | 2/2014 |
| WO | 2014076526 A1 | 5/2014 |
| WO | 2014083320 A1 | 6/2014 |

* cited by examiner

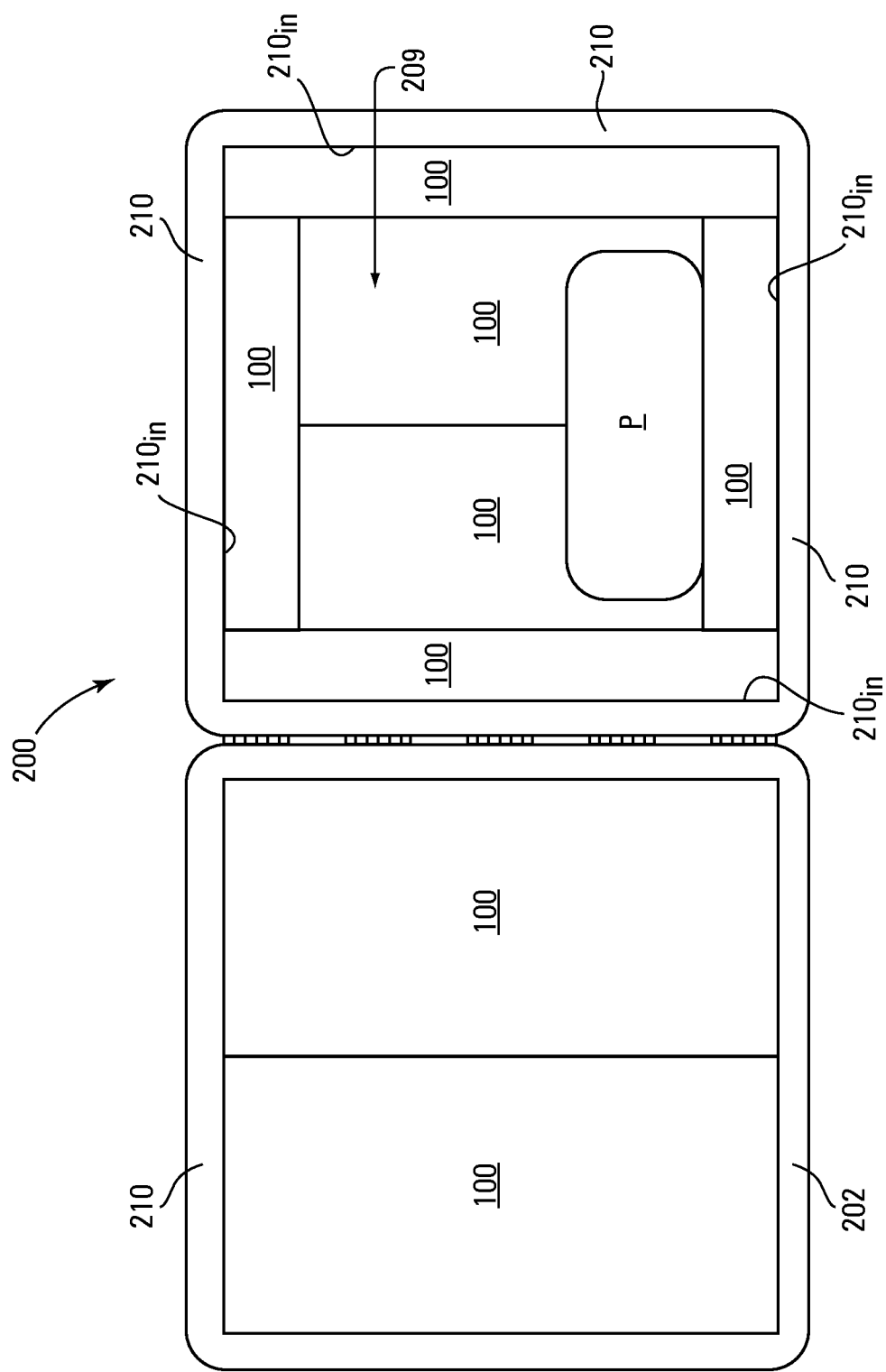

HIGH EFFICIENCY BOLT-ON THERMAL INSULATING PANEL AND THERMALLY INSULATED SHIPPING CONTAINER EMPLOYING SUCH A THERMAL INSULATING PANEL

BACKGROUND

Goods such as medical supplies, blood, and vaccines are extremely temperature sensitive and need to be maintained within a given temperature range to prevent deterioration, denaturing and spoilage. Thermal control is particularly challenging during transport of such thermally labile goods.

Shipment of such thermally labile goods is commonly effected with both actively controlled (i.e., powered) and passively controlled (i.e., unpowered with thermally conditions phase change panels) thermally insulated shipping containers. Vacuum insulated panels (VIPs) are the generally preferred form of thermal insulation in such shipping container as they provide superior thermal insulation, so long as the internal vacuum remains intact. However, once the vacuum is lost the thermal performance of a VIP is greatly reduced.

While generally preferred, VIPs present a couple of challenges. First, it is difficult to secure VIPs into place within a thermally insulated shipping container as the vacuum sealed nature of the VIPs prevents use of traditional pass-through fasteners. JP2000248653 attempts to resolve this challenge by encapsulating a VIP within rigid foam insulation, and mounting the resultant assembly with nails driven through the foam only margins of the assembly. While effective for allowing VIPs to be mounted with traditional pass-through fasteners, the foam-only margins leave large gaps between the VIPS, reducing the thermal insulating value of the assembly.

U.S. Pat. No. 8,202,599 offers another solution by providing sealed through-holes in the VIP. While effective for facilitating mounting of the VIPs with traditional fasteners, formation of the through-holes greatly increases both the cost of the VIPs and the likelihood of a premature loss of vacuum resulting from an imperfect sealing of one of the through-holes.

Another challenge presented by the use of VIPs is the limited average useful lifespan of VIPs relative to other components of a typical thermally insulated shipping container, resulting in a frequent need to replace spent VIPs and/or refurbish thermally insulated shipping containers with a fresh set of VIPs. Hence, it is desired to thermally insulate shipping containers with VIPs in such a manner that the VIPs can be readily removed and replaced. Current efforts to facilitate replacement of VIPs in thermally insulated shipping container are complex and expensive, and/or result in gaps between the VIPs, reducing the thermal insulating value of the VIPs.

Accordingly, a need continues to exist for an inexpensive VIP assembly that allows for both a complete unbroken lining of a thermally insulated shipping container with VIPs, and quick and easy attachment and detachment of the VIPs to the thermally insulated shipping container.

SUMMARY OF THE INVENTION

A first aspect of the invention is directed to a bolt-on thermal insulation panel assembly. The thermal insulation panel assembly includes an integrated superimposed assembly of a hermetically sealed, solid, vacuum insulation panel and a layer of rigid foam insulation with a plurality of mechanical fasteners secured to the layer of rigid foam insulation. The vacuum insulation panel has transversely spaced first and second major surfaces with the first major surface defining a perimeter. The layer of rigid foam insulation is superimposed upon the first major surface of the vacuum insulation panel. The plurality of mechanical fasteners are secured to the layer of rigid foam insulation within a transverse projection of the perimeter of the vacuum insulation panel, with each mechanical fastener aligned within a transverse bore in the layer of rigid foam insulation.

In a preferred embodiment the panel further comprises a casing configured and arranged for uniting the vacuum insulation panel and layer of rigid foam.

A second aspect of the invention is a thermally insulated shipping container that includes a shell and at least one bolt-on thermal insulation panel assembly of the first aspect of the invention. The shell has inner surfaces that define a retention chamber, and a plurality of apertures therethrough. The at least one bolt-on thermal insulation panel assembly is bolted onto an inner surface of the shell via the plurality of mechanical fasteners on the bolt-on thermal insulation panel assembly.

A third aspect of the invention is a method of assembling a thermally insulated shipping container according to the second aspect of the invention. The assembly method includes the steps of (i) obtaining a shell with inner surfaces defining a retention chamber and having a plurality of apertures therethrough, (ii) obtaining at least one bolt-on thermal insulation panel assembly according to the first aspect of the claimed invention, (iii) placing the at least one bolt-on thermal insulation panel assembly against an inner surface of the shell with the exposed major surface of the layer of rigid foam insulation facing the inner surface of the shell and at least two of the transverse bores in the layer of rigid foam insulation aligned with a corresponding aperture through the shell, and (iv) bolting the bolt-on thermal insulation panel assembly to the shell by rotating mated mechanical fasteners, each in threaded engagement with a mechanical fastener on the bolt-on thermal insulation panel assembly, from outside the retention chamber.

A fourth aspect of the invention is a method of shipping thermally labile goods employing a thermally insulated shipping container according to the second aspect of the invention. The shipping method includes the steps of (i) obtaining a thermally insulated shipping container according to the second aspect of the invention, (ii) placing a payload of thermally conditioned thermally labile goods into the retention chamber of the thermally insulated shipping container to form a loaded shipping container, (iii) sealing the retention chamber of the loaded shipping container to form a sealed shipping container, and (iv) arranging for transport of the sealed shipping container to a different location.

BRIEF DESCRIPTION OF THE DRAWINGS

FIG. 8 is a front view of the thermally insulated shipping container of FIG. 7 with the door open to facilitate viewing of the thermally insulated retention chamber and payload.

DETAILED DESCRIPTION OF A PREFERRED EMBODIMENT

Definitions

Figure 1:
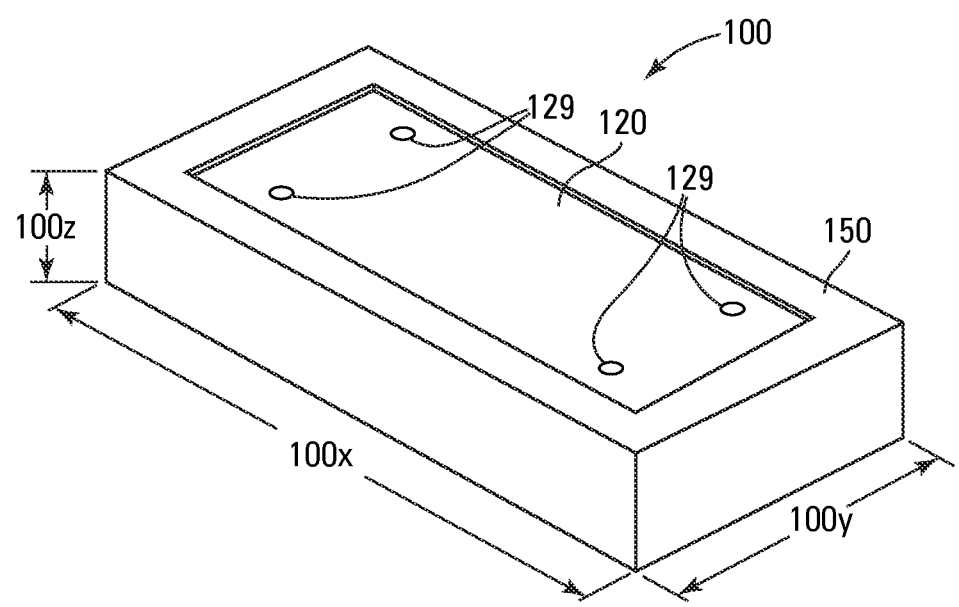
FIG. 1 is an isometric view of one embodiment of a thermal insulating panel in accordance with the invention.
Figure 2:
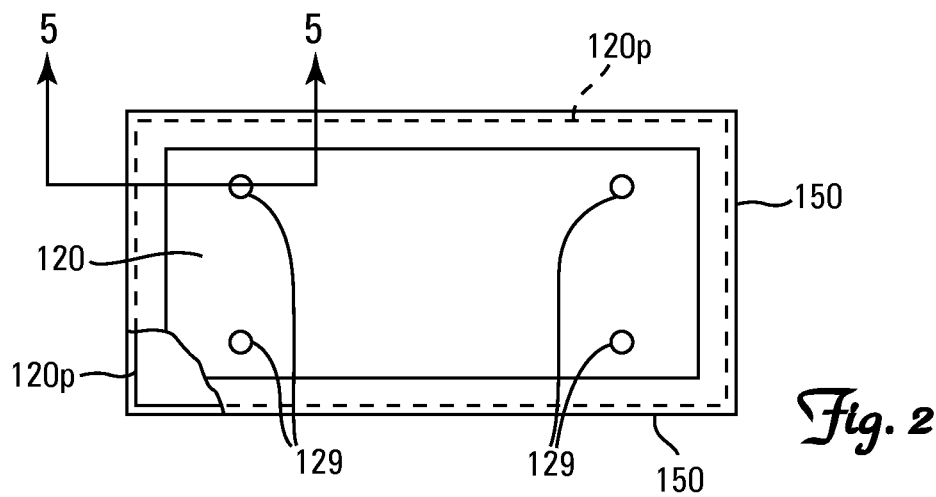
FIG. 2 is a top view of the thermal insulating panel of FIG. 1 with a portion of the casing removed to show an internal layer.

As utilized herein, including the claims, the term "solid" means having no gaps, breaks, holes, fissures, discontinuities or interruptions.

NOMENCLATURE

100 Thermal Insulation Panel Assembly
$100x$ Length of Thermal Insulation Panel Assembly
$100y$ Width of Thermal Insulation Panel Assembly
$100z$ Height (Thickness) of Thermal Insulation Panel Assembly
110 Vacuum Insulation Panel
$110_1$ First Major Surface of Vacuum Insulation Panel
$110_2$ Second Major Surface of Vacuum Insulation Panel
$110_p$ Perimeter of Vacuum Insulation Panel
120 Layer of Rigid Foam Insulation
$120_{in}$ Inward Major Surface of Layer of Rigid Foam Insulation
$120_{out}$ Outward Major Surface of Layer of Rigid Foam Insulation
$120_p$ Perimeter of Layer of Rigid Foam Insulation
129 Bore in Layer of Rigid Foam Insulation
130 Mechanical Fastener Secured to Rigid Foam Insulation
130a Nut Secured to Rigid Foam Insulation
130b Bolt Secured to Rigid Foam Insulation
140 Bushing
150 Casing
200 Thermally Insulated Shipping Container
202 Door
203 Door Latch
209 Payload Retention Chamber of Thermally Insulated Shipping Container
210 Shell
$210_{in}$ Inner Surfaces of Shell
219 Apertures Through Shell
230 Mated Mechanical Fastener
230b Bolt Threadably Mated to Nut Secured to Rigid Foam Insulation
P Payload Construction Bolt-On Thermal Insulation Panel Assembly With reference to the illustrative drawings, and particularly to FIGS. 1-6, a first aspect of the invention is directed to a bolt-on thermal insulation panel assembly 100. Referring specifically to FIGS. 2-6, the thermal insulation panel assembly 100 includes a superimposed assembly of a hermetically sealed, solid, vacuum insulation panel 110 and a layer of rigid foam insulation 120. A plurality of mechanical fasteners 130 (e.g., nuts 130a or bolts 130b) are secured to the layer of rigid foam insulation 120 for use in releasably mounting the thermal insulation panel assembly 100 to a shipping container to form a thermally lined insulated shipping container 200.

Referring specifically to FIG. 1, the thermal insulation panel assembly 100 has a length $100x$, a width $100y$ and a height or thickness $100z$. Preferred dimensions of the thermal insulation panel assemblies 100 and each of its constituent layers, when intended for use in construction of thermally insulated shipping containers 200, are set forth below in TABLE ONE.

TABLE ONE

| | Length (cm) | Width (cm) | Height (cm) |
|---|---|---|---|
| THERMAL INSULATION PANEL ASSEMBLY 100 | | | |
| General | 10 to 200 | 10 to 200 | 1 to 20 |
| Preferred | 20 to 100 | 20 to 100 | 2 to 10 |
| Most Preferred | 20 to 50 | 20 to 30 | 2 to 5 |
| Vacuum Tribulation Panel 110 | | | |
| General | 10 to 200 | 10 to 200 | 1 to 10 |
| Preferred | 20 to 100 | 20 to 100 | 1 to 5 |
| Most Preferred | 20 to 50 | 20 to 30 | 1 to 3 |
| Rigid Foam Insulation 120 | | | |
| General | 10 to 200 | 10 to 200 | 1 to 10 |
| Preferred | 20 to 100 | 20 to 100 | 1 to 5 |
| Most Preferred | 20 to 50 | 20 to 30 | 1 to 3 |

Figure 3:
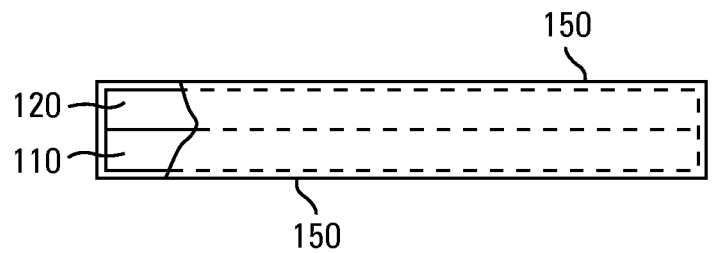
FIG. 3 is a side view of the thermal insulating panel of FIG. 2 with a portion of the casing removed to show the internal layers.
Figure 4:
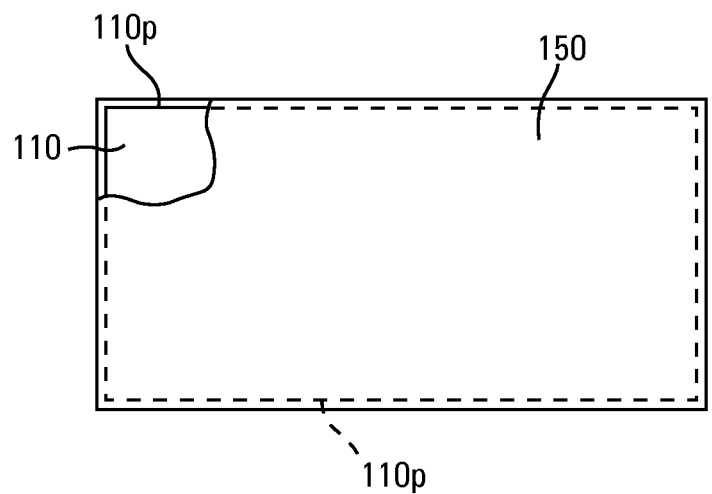
FIG. 4 is a bottom view of the thermal insulating panel of FIG. 2 with a portion of the casing removed to show an internal layer.
Figure 5:
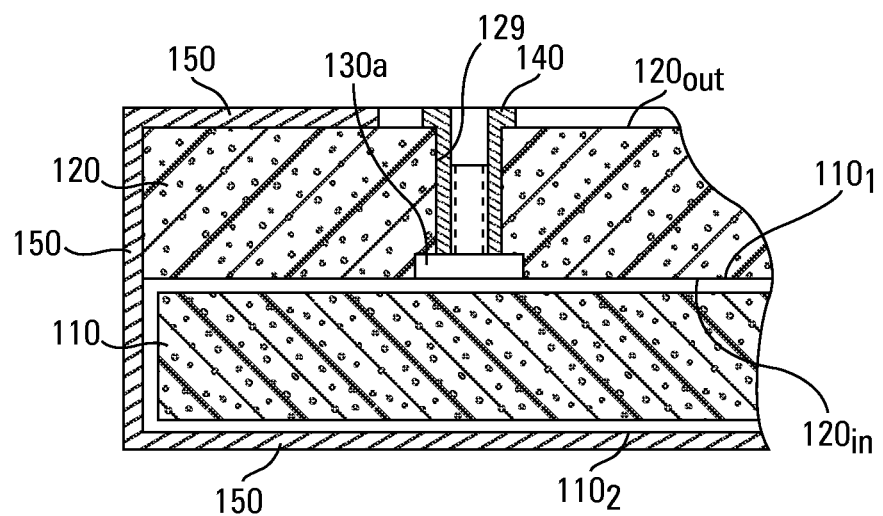
FIG. 5 is an enlarged cross-sectional side view of the thermal insulating panel of FIG. 1 taken along line 5-5.
Figure 6:
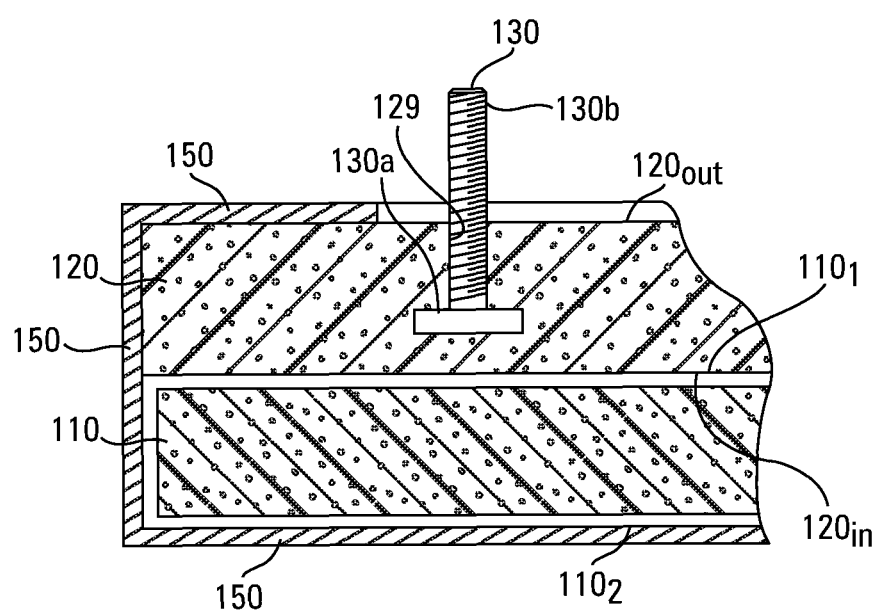
FIG. 6 is an enlarged cross-sectional side view of an alternative thermal insulating panel in accordance with the invention.

Referring to FIGS. 5 and 6, a vacuum insulated panel 110 is a technologically advanced insulation product consisting of a cell foam core material (not separately numbered) to which a vacuum is applied, surrounded by a gas tight outer film (not separately numbered). A vacuum insulated panel 110 is a highly efficient insulator so long as the integrity of the vacuum is not compromised. Once the vacuum is lost, the panel 110 provides only modest insulating value and should be replaced. Referring specifically to FIGS. 3, 4 and 5, the vacuum insulation panel 110 employed in the thermal insulation panel assembly 100 has transversely spaced first and second major surfaces ($110_1$ and $110_2$ respectively) with the first major surface $110_1$ defining a perimeter $110_p$.

Referring specifically to FIGS. 1,3, 5 and 6, the layer of rigid foam insulation 120 employed in the thermal insulation panel assembly 100 has transversely spaced inward facing and outward facing major surfaces ($120_{in}$ and $120_{out}$ respectively) with the inward facing major surface $120_{in}$ defining a perimeter $120_p$. The layer of rigid foam insulation 120 is superimposed upon the vacuum insulated panel 110 with the inward facing major surface $120_{in}$ of the layer of rigid foam insulation 120 facing the first major surface $110_1$ of the vacuum insulation panel 110.

The layer of rigid foam insulation 120 may be selected from any suitable thermally insulating foam material having the necessary structural integrity, including specifically but not exclusively materials such as polystyrene, polyisocyanurate and polyurethane.

Referring to FIGS. 1, 2, 5 and 6 the plurality of mechanical fasteners 130 (depicted as closed-end t-nuts 130a in FIG. 5 and bolts 130b in FIG. 6) are positioned within the peripheral border $110p$ of the vacuum insulated panel 110, but are secured to and pass through only the layer of rigid foam insulation 120 so as not to compromise the sealed integrity of the vacuum insulated panel 110. The mechanical fasteners 130 may be pressed into the layer of rigid foam insulation 120 from the inward major surface $120_{in}$ prior to superimposing the layer of rigid foam insulation 120 onto a vacuum insulated panel 110, such that the mechanical fastener 130 may rest against the first major surface $110_1$ of the vacuum insulated panel 110, as depicted in FIG. 5, or they may be molded into the layer of rigid foam insulation 120, such that the mechanical fastener 130 may be transversely offset from the vacuum insulated panel 110, as depicted in FIG. 6.

The mechanical fasteners 130 are position within corresponding transverse bores 129 in the rigid foam insulation 120. The thermal insulation panel assembly 100 should include at least three and preferably at least four mechanical fasteners 130. Additional mechanical fasteners 130 may be employed as necessary and appropriate.

The mechanical fasteners 130 are secured to the layer of rigid foam insulation 120 so as to resist axial rotation of the mechanical fasteners 130 that inherently results during threaded engagement of the mechanical fasteners 130 by a mated mechanical fastener 230. Such resistance to axial rotation may be provided by any number of means including specifically but not exclusively square or rectangular shaped t-nuts or carriage bolts with a torque washer.

Referring to FIG. 5, when the mechanical fasteners 130 are nuts 130a, it is generally desired to insert a protective pilot bushing 140 within the bore 129 to prevent mated bolts 230b inserted into the bores 129 and into threaded engagement with the corresponding nut 130a from damaging the rather frangible rigid foam insulation 120 during assembly and subsequent use.

Referring to FIG. 6, when the mechanical fasteners 130 are bolts 130b, it is generally desired to use round, flat headed bolts so as to reduce the likelihood of the bolt head puncturing the vacuum insulated panel 110.

The vacuum insulation panel 110 and layer of rigid foam insulation 120 may be secured together to form an integrated assembly 100 by any suitable means, so long the sealed integrity of the vacuum insulated panel 110 is not compromised. Suitable integration options include specifically but not exclusively, adhesive lamination, double sided tape positioned between the layers, packaging tape wrapped around both layers, shrink wrap wrapped around both layers, etc. Referring to FIGS. 1-6, a preferred option for securing the vacuum insulation panel 110 and layer of rigid foam insulation 120 together into an integrated assembly 100 is a casing 150 which protectively covers all exposed surfaces of the vacuum insulation panel 110 and encompasses the peripheral margins of the outward major surface $120_{out}$ of the rigid foam insulation layer 120 without covering the mechanical fasteners 130 or the bores 129 in the rigid foam insulation layer 120. An effective plastic casing 150 may be constructed from a wide variety of materials, with plastic generally preferred. One suitable material for use as the casing 150 is polycarbonate.

Thermally Insulated Shipping Container

Figure 7:
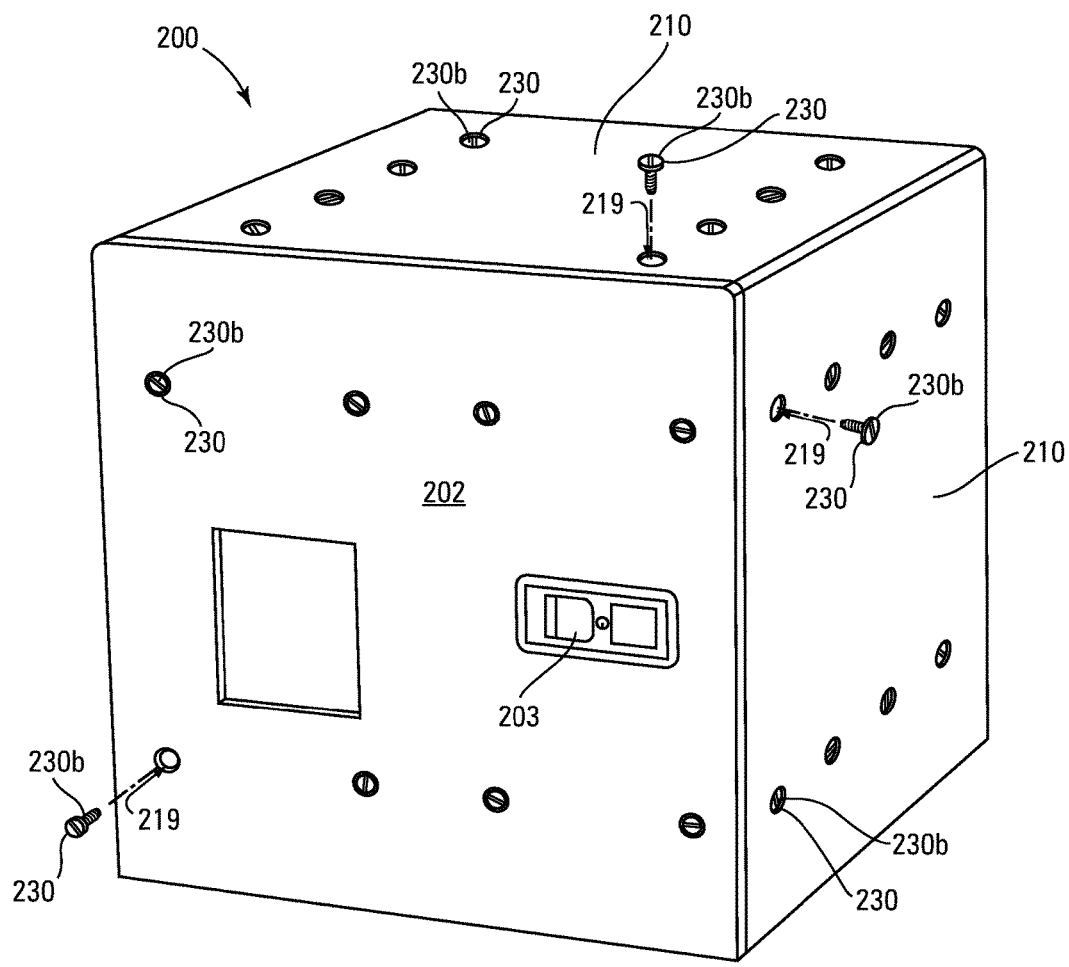
FIG. 7 is an isometric view of one embodiment of a thermally insulated shipping container in accordance with the invention.

With reference to the illustrative drawings, and particularly to FIGS. 7 and 8, a second aspect of the invention is directed to a thermally insulated shipping container 200 that employs a bolt-on thermal insulation panel assembly 100 of the first aspect of the invention. Referring specifically to FIGS. 7 and 8, the thermally insulated shipping container 200 defines a payload retention chamber 209 and includes a structural shell 210 with at least one bolt-on thermal insulation panel assembly 100 secured to the inner surface $210_{in}$ of the shell 210 for forming a thermally insulated payload retention chamber 209.

The structural shell 210 may be constructed from any material possessing the necessary structural integrity, including specifically but not exclusively corrugated cardboard, wood including natural and manufactured wood boards, plastics and metals. The structural shell 210 may comprise the outer shell of a traditional shipping container, such as depicted in FIGS. 7 and 8, or may constitute a framework to be employed as an inner liner within such an outer shell.

Referring to FIG. 7, a plurality of apertures 219 are provided through the shell 210, configured and arranged to align with mechanical fasteners 130 and corresponding bores 129 in thermal insulation panel assemblies 100, thereby allowing mated mechanical fasteners 230 to engage corresponding mechanical fasteners 130 on the thermal insulation panel assemblies 100 through each aligned aperture 219 (i.e., threading a nut (not shown) onto a bolt 130b extending from the associated thermal insulation panel assembly 100 through an aligned aperture 219 in the shell 210, or extending a bolt 230b through an aligned aperture 219 in the shell 210 and into threaded mating engagement with a nut 130a on the associated thermal insulation panel assembly 100), thereby securing thermal insulation panel assemblies 100 against the inner surface $210_{in}$ of the shell 210 and forming a thermally insulating inner liner.

Referring to FIG. 8, because the perimeter $110_p$ of the vacuum insulation panel 110 and the perimeter $120_p$ of the rigid foam insulation 120 are coterminous on each thermal insulation panel assembly 100, the shell 210 can be lined with a solid layer of vacuum insulation panels 110.

Referring generally to FIGS. 7 and 8, the thermally insulated shipping container 200 includes an access opening, such as a removable or hinged top, lid, cover or door 202, with or without a latch 203, through which a payload P may be inserted into the payload retention chamber 209.

Method of Assembly

A third aspect of the invention is a method of assembling a thermally insulated shipping container 200 employing the bolt-on thermal insulation panel assemblies 100. The assembly method includes the steps of (i) obtaining a shell 210 with inner surfaces $210_{in}$ that define a retention chamber 209 and have a plurality of apertures 219 therethrough, (ii) obtaining at least one bolt-on thermal insulation panel assembly 100, (iii) placing the at least one bolt-on thermal insulation panel assembly 100 against an inner surface of the shell 210 with the outward facing exposed major surface $120_{out}$ of the layer of rigid foam insulation 120 facing the inner surface $210_{in}$ of the shell 210 and at least two, and preferably all, of the transverse bores 129 in the layer of rigid foam insulation 120 aligned with a corresponding aperture 219 through the shell 210, and (iv) bolting the bolt-on thermal insulation panel assembly 100 to the shell 210 by rotating mated mechanical fasteners (i.e., a nut (not shown) when the mechanical fastener on the thermal insulation panel assembly 100 is a bolt 130b, or a bolt 230b when the mechanical fastener on the thermal insulation panel assembly 100 is a nut 130a), each in threaded engagement with a mechanical fastener 130 on the bolt-on thermal insulation panel assembly 100, from outside the retention chamber 209. Steps (iii) and (iv) are preferably repeated until the entire inner surface of the shell 210 is lined with bolt-on thermal insulation panel assemblies 100.

Method of Shipping

A fourth aspect of the invention is a method of shipping thermally labile goods P employing a thermally insulated shipping container 200 according to the second aspect of the invention. The shipping method includes the steps of (i) obtaining a thermally insulated shipping container 200, (ii) placing a payload of thermally conditioned thermally labile goods P into the retention chamber 209 of the thermally insulated shipping container 209 to form a loaded shipping container 200, (iii) sealing the retention chamber 209 of the loaded shipping container 200 to form a sealed shipping container 200, and (iv) arranging for transport of the sealed shipping container 200, commonly via a commercial courier delivery service such as USPS, UPS, FedEx etc., to a different location.

I claim:

1. A bolt-on thermal insulation panel assembly having a thickness that extends in a transverse direction, comprising:
   (a) an integrated assembly including at least:
      (i) a hermetically sealed, solid, vacuum insulation panel having first and second major surfaces spaced in the transverse direction, wherein the first major surface defines a perimeter, and
      (ii) a layer of rigid foam insulation superimposed upon the first major surface of the vacuum insulation panel, and
   (b) a plurality of mechanical fasteners transversely positioned over the vacuum insulated panel and secured to the layer of rigid foam insulation, wherein each mechanical fastener is aligned within a bore in the layer of rigid foam insulation that extends in the transverse direction.

2. The bolt-on thermal insulation panel assembly of claim 1 wherein the panel further comprises at least a casing configured and arranged for uniting the vacuum insulation panel and layer of rigid foam.

3. The bolt-on thermal insulation panel assembly of claim 1 wherein the thermal insulation panel has a thickness of between 2 and 10 cm.

4. The bolt-on thermal insulation panel assembly of claim 1 wherein the thermal insulation panel has a length of between 20 and 200 cm and a width of between 20 and 200 cm.

5. The bolt-on thermal insulation panel assembly of claim 1 wherein (i) the layer of rigid foam insulation has inward and outward facing major surfaces spaced in the transverse direction, (ii) the inward facing major surface defines a perimeter, and (iii) the perimeter of the rigid foam insulation is coterminous with the perimeter of the vacuum insulation panel.

6. A thermally insulated shipping container, comprising:
   (a) a shell with inner surfaces defining a retention chamber and having a plurality of apertures therethrough, and
   (b) at least two abutting bolt-on thermal insulation panel assemblies according to claim 5 bolted onto an inner surface of the shell via the plurality of mechanical fasteners on the bolt-on thermal insulation panel assembly.

7. The bolt-on thermal insulation panel assembly of claim 1 comprising at least three mechanical fasteners secured to the layer of rigid foam insulation.

8. The bolt-on thermal insulation panel assembly of claim 1 comprising at least four uniformly dispersed mechanical fasteners secured to the layer of rigid foam insulation.

9. The bolt-on thermal insulation panel assembly of claim 8 wherein the mechanical fasteners are closed end t-nuts.

10. The bolt-on thermal insulation panel assembly of claim 1 comprising at least six mechanical fasteners secured to the layer of rigid foam insulation.

11. The bolt-on thermal insulation panel assembly of claim 1 wherein the mechanical fasteners are t-nuts.

12. The bolt-on thermal insulation panel assembly of claim 11 wherein the t-nuts are secured to the layer of rigid foam insulation so as to resist rotation during threaded mating with a bolt.

13. A thermally insulated shipping container, comprising:
   (a) a shell with inner surfaces defining a retention chamber and having a plurality of apertures therethrough, and
   (b) at least four bolt-on thermal insulation panel assemblies according to claim 12 bolted onto an inner surface of the shell via bolts extending through the apertures in the shell and into threaded engagement with the t-nuts on the bolt-on thermal insulation panel assembly.

14. The bolt-on thermal insulation panel assembly of claim 1 wherein (i) the layer of rigid foam insulation has inward and outward facing major surfaces spaced in the transverse direction, and (ii) the mechanical fasteners are bolts that project outward from the outward facing major surface.

15. The bolt-on thermal insulation panel assembly of claim 14 wherein the bolts are flat head bolts.

16. The bolt-on thermal insulation panel assembly of claim 14 wherein the bolts are secured to the layer of rigid foam insulation so as to resist rotation during threaded mating with a nut.

17. The bolt-on thermal insulation panel assembly of claim 1 wherein (i) the layer of rigid foam insulation has inward and outward facing major surfaces spaced in the transverse direction, (ii) the bores in the layer of rigid foam insulation are through-holes, and (iii) the mechanical fasteners extend into the through-holes from the inner facing major surface.

18. The bolt-on thermal insulation panel assembly of claim 1 wherein the mechanical fasteners are embedded within the layer of rigid foam insulation whereby the mechanical fasteners are spaced from the first major surface of the vacuum insulated panel in the transverse direction.

19. A thermally insulated shipping container, comprising:
   (a) a shell with inner surfaces defining a retention chamber and having a plurality of apertures therethrough, and
   (b) at least one bolt-on thermal insulation panel assembly according to claim 1 bolted onto an inner surface of the shell via the plurality of mechanical fasteners on the bolt-on thermal insulation panel.

20. A method of shipping thermally labile goods, comprising the steps of:
   (a) obtaining a thermally insulated shipping container according to claim 19,
   (b) placing a payload of thermally conditioned thermally labile goods into the retention chamber of the thermally insulated shipping container to form a loaded shipping container,
   (c) sealing the retention chamber of the loaded shipping container to form a sealed shipping container, and
   (d) arranging for transport of the sealed shipping container to a different location.

21. A method of assembling a thermally insulated shipping container, comprising the steps of:
   (a) obtaining a shell with inner surfaces defining a retention chamber and having a plurality of apertures therethrough,
   (b) obtaining at least one bolt-on thermal insulation panel assembly according to claim 1,
   (c) placing the at least one bolt-on thermal insulation panel assembly against an inner surface of the shell with the exposed major surface of the layer of rigid foam insulation facing the inner surface of the shell and at least two of the transverse bores in the layer of rigid foam insulation aligned with a corresponding aperture through the shell, and (d) bolting the bolt-on thermal insulation panel assembly to the shell by rotating mated mechanical fasteners, each in threaded engagement with a mechanical fastener on the bolt-on thermal insulation panel assembly, from outside the retention chamber.

* * * * *